United States Patent Office 3,574,696
Patented Apr. 13, 1971

3,574,696
ACETYLENIC DIPERESTERS
Ronald L. Friedman, San Rafael, and Roger N. Lewis, Pinole, Calif., assignors to Argus Chemical Corporation, San Rafael, Calif.
No Drawing. Continuation-in-part of application Ser. No. 511,354, Dec. 3, 1965. This application Aug. 1, 1968, Ser. No. 749,339
The portion of the term of the patent subsequent to May 13, 1986, has been disclaimed
Int. Cl. C07c *69/00*
U.S. Cl. 260—453          9 Claims

ABSTRACT OF THE DISCLOSURE

Aliphatic diperesters of alkyne diols useful as polymerization initiators.

---

This application is a continuation-in-part of U.S. patent application S.N. 511,354, filed Dec. 3, 1965, now U.S. Patent 3,444,230.

This invention relates to an improved process for polymerizing polyesters and to certain novel peresters of polyfunctional peroxy alkynes which are especially suitable as catalysts for such polymerization reactions.

The plastics industry makes a great deal of use of polyester materials which are polymerized, cured and molded into a variety of end products. The polymerization reaction is prevalently initiated with organic peroxide free radical catalysts. One problem encountered during curing and molding of polyesters initiated with the presently available peroxides is the relatively large number of finished articles which must be discarded as unsalable because of flaws in the resin structure. With most available catalysts, the resin tends to crack, craze and shrink during curing frequently enough to present an economic problem to the molder.

The present invention is based upon the discovery that diperesters of alkyne diols will substantially eliminate the various distortions of the finished molded resin noted above. This advantage in the curing and molding of polyesters has been found to be common to all diperesters of alkyne diols, including diperesters in which the organic group attached to the carbonyl radical is either aromatic or aliphatic.

In discovering the broad principle by which molded polyester distortion is substantially reduced, a new group of compounds was discovered. Thus, within the large group of alkyne diperesters which are useful in the present process, diperesters in which the esterifying group is aliphatic are new compounds. This group of compounds constitutes inventive subject matter in this application in addition to the broad process of curing and molding polyesters with all alkyne dipesesters.

Certain of the new aliphatic diperesters of alkyne polyols have been shown to possess unexpected and advantageous properties which set them apart from the other members of the new aliphatic diperester group. The aliphatic diperesters in which the alpha carbon atom of the esterifying group is secondary or tertiary represents a group of preferred catalysts which produce desirable cures of resin within shorter periods of time and/or produce higher peak resin temperatures during the cure than are obtainable with other diperesters and related peroxide catalysts generally known and used for comparable commercial applications. In addition, these preferred branched chain diperesters exhibit the advantageous properties described in copending U.S. patent application, Ser. No. 324,244, filed Nov. 18, 1963, now U.S. Patent 3,264,274 in that they produce resin end products having little or no discoloration.

By way of further definition, the new class of aliphatic diperesters of alkyne diols herein discovered have the following general structural formula:

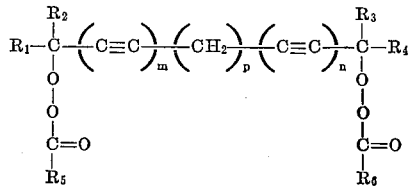

wherein $R_1$, $R_2$, $R_3$ and $R_4$ are hydrocarbon groups, preferably lower alkyl groups, i.e., having from about 1 to 5 carbon atoms, which may be in a straight chain or branched. The $m$ and $n$ are whole number integers from 0 to 1 with the proviso that their sum always be at least 1. The $p$ is a positive whole number integer from 0 to 7. $R_5$ and $R_6$ may be the same or different aliphatic groups of from 1 to 20 carbon atoms having non-interfering substituents as desired. Such radicals include methyl, ethyl, propyl, isobutyl, pentyl, decyl, tridecyl, pentadecyl, heptadecyl, nonadecyl, eicosyl and the like. To take advantage of the solubility of these catalysts with polyesters, it is desirable to limit the $R_5$ and $R_6$ groups to about 12 carbon atoms. In addition, those alkyl groups that are attached to the carbonyl carbon at an internal carbon atom, i.e., wherein $R_5$ and/or $R_6$ are secondary (singularly branched) hydrocarbon radicals, are preferred.

As hereinbefore mentioned, the catalysts useful in the process of this invention also include the diperesters of alkyne diols wherein the perester linkage results from the addition of a carbonyl-containing aromatic group to an organic dihydroperoxide, i.e., wherein $R_5$ and $R_6$ in the above structural formula are hydro-carbons such as similar or dissimilar aryl groups, of from 6 to 20 carbon atoms, e.g., phenyl, benzyl, naphthyl, and the like.

The diperesters of alkyne diols in which the carbonyl linkage of the diperester is attached to either an aromatic or aliphatic group, when employed to initiate the polymerization of polyesters, substantially eliminate the undesirable distortion or warping prevalant in present conventional molding operations.

Examples of the compounds of this invention which have been found to initiate the polymerization of polyesters without the attendant disadvantages generally found in the prior art include the following among many others which could be listed:

2,5-dimethyl-2,5-diper(2-ethyl hexanoate) hexyne-3
2,5-diethyl-2,5-diper(2-ethyl hexanoate) hexyne-3
2,5-dimethyl-2,5-diperoctanoate hexyne-3
2,5-dimethyl-2,5-diperbenzoate hexyne-3
2,5-dimethyl-2,5-diperdecanoate hexyne-3
2,5-dimethyl-2,5-diper(2,2-diethyl hexanoate) hexyne-3
2,5-dimethyl-2-per(2-ethyl hexanoate)-5-peroctanoate hexyne-3
2,5-dimethyl-2,5-diper(pivalate) hexyne-3
2,5-dimethyl-2,5-diper(2-propyl pentanoate) hexyne-3
3,6-dimethyl-3,6-diperdecanoate octyne-4
3,6-dimethyl-3,6-dipercrotonoate octyne-4
2,4,7,9-tetramethyl-4,7-diper(2-methyl butanoate) decyne-5
4,7-dimethyl-4,7-dipertridecanoate decyne-5
3,8-dimethyl-3,8-diper(2-ethyl hexanoate) decyne-4
2,7-dimethyl-2,7-diperoctanoate octyne-4
2,11-dimethyl-2,11-diperoctanoate dodecadi-3,9-yne
2,7-dimethyl-2,7-diper(2-ethyl hexanoate) octadi-3,5-yne
3,8-dimethyl-3,8-diperbenzoate decadi-4,6-yne 2,8-dimethyl-2,8-diper(2-propyl pentanoate) nonadi-3,6-yne 3,10-dimethyl-3,10-diper(4-methyl benzoate) dodecadi-4,8-yne Generally, prior art peroxides having acetylenic unsaturation are known to be "slow" catalysts, especially in comparison to the corresponding saturated peroxides. By this is meant that the polymerization reactions initiated by the prior art acetylenic peroxides do not reach peak temperature as rapidly as the corresponding prior art saturated peroxides. As a result thereof, curing requires a longer period of time. In this regard, there appears to be a direct correlation between the "half life" of the particular prior art peroxide catalyst and the length of time needed to reach peak temperature, i.e., the "half life," as well as "time to peak temperature," of the acetylenic unsaturated peroxides has generally been substantially longer than the "half life" and the "time to peak temperature" of the corresponding saturated peroxide.

The acetylenic unsaturated peroxides used in the process of this invention, i.e., the diperesters of alkyne diols, usually have a longer "half life" than the corresponding diperester of an alkane diol, in some cases longer by more than a factor of 3,; see Table I. However, in spite of this apparent undesirable length of "half life," the diperesters of alkyne diols have been found to be generally "fast" catalysts when compared to the corresponding saturated disperester; see Table II in Example IV. Further, as will be seen in Table II, when the branched chain and aromatic disperesters of alkyne diols are compared to each other, it has been found that the branched chain diperesters are much "faster" catalysts.

TABLE I

| | Half-life (hours) at 100° C. |
|---|---|
| 2,5-dimethyl-2,5-diperbenzoate hexane | 6 |
| 2,5-dimethyl-2,5-diperbenzoate hexyne-3 | 22 |
| 2,5-dimethyl-2,5-diper(2-ethyl hexanoate) hexane | 0.15 |
| 2,5-dimethyl-2,5-diper(2-ethyl hexanoate) hexyne-3 | 0.20 |

Therefore, in the preferred aspect of this invention, the organic group atached to the carbonyl linkage of the perester are branched alkyl groupings, i.e., wherein the carbon atom attached directly to the carbonyl group (the alpha carbon) is a secondary carbon atom. Such catalysts, employed to initiate the polymerization of polyesters, not only substantially eliminate distortion and reduce discoloration, they are also "fast," i.e., they shorten the time necessary to reach peak curing temperature and/or increase the peak curing temperature, especially in comparison to prior art organic peroxide catalysts. This desirable atribute has the beneficial effect of completing the curing proces in a shorter lapsed time, thereby enabling more product units to be molded during a given time period.

These preferred disperesters of alkyne diols are illustrated by the following structural formula:

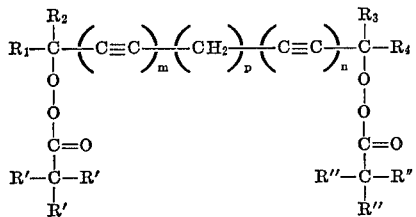

wherein $R_1$, $R_2$, $R_3$, $R_4$, $m$ and $n$ have the definitions given above, $p$ is preferably a positive whole number integer from 0 to 4 and R' and R" are selected from the group containing the hydrogen atom and alkyl radicals, provided that at least one R' and R" are hydrogen atoms. Hence, it will be seen that each carbon atom atached directly to a carbonyl group, i.e., the alpha carbon atom, is either a primary or a secondary carbon atom.

As before, it is preferred that the R"s and the R'"s total not more than about 19 carbon atoms so that each of the alkyl groups atached directly to the carbonyl groups are limited to about 20 carbon atoms.

The organic diperesters of the invention may be prepared by the conventional techniques generally known to one skilled in this art. These include the reaction of a dihydroperoxide of the corresponding dihydroxy alkyne with a carboxylic acid (R—COOH), wherein the organic radical (R) corresponds to the hydrocarbon radical desired in the diperester catalyst. It is preferred to employ an acid halide, such as a chloride, of the corresponding carboxylic acid in the reaction with the dihydroperoxide to form the ester. In addition, the corersponding anhydride of the carboxylic acid can be utilized.

The esterification reaction can be executed in a suitable solvent such as chloroform. However, there are many suitable reactants that may require no solvent. When an acid halide is used, an organic or inorganic base is employed to neutralize the acid liberated in the esterification reaction. The base is suitably employed in excess. The reaction proceeds fairly rapidly in most cases and is complete within several hours. In most instances, no heat need be applied, although in the formation of certain of the catalysts, slight warming may be desirable.

Normally, an ester group will be desired at both sites of the diperoxide molecule. Therefore, at least 2 moles of, for example, the acid halide will be used for each mole of the hydroperoxy alkyne. If mixed esters are sought, one mole of each of the acide halides selected can be reacted with one mole of the hydroperoxy alkyne.

The polymerization process of this invention is capable of wide application to conventional polyesters which polymerize when subjected to peroxide-type catalysts. Examples of this broad grouping, well-known to those skilled in this art, are illustrated in the McGraw-Hill Encyclopedia of Science and Technology, vol. 10, pp. 466–468, 1960.

In commercial application, conventional curing and molding of polyesters are usually accomplished in molds which are maintained at elevated temperatures, such as 180–350° F., to reduce the reaction time to a minimum.

To further illustrate the novel process of this invention, the following examples be provided. It should be understood that the details thereof are not to be regarded as limitations as they may be varied as will be understood by one skilled in this art.

EXAMPLE I

Preparation of 2,5-dimethyl-2,5-dihydroperoxy hexyne-3

To a cold mixture (−2° C.) of 52.5 grams of 50% hydrogen peroxide and 69 grams of 95.5% sulfuric acid was added in small portions over a period of one hour, 50 grams of 2,5-dimethyl-2,5-dihydroxy hexyne-3. Mechanical stirring was continued for four hours while the temperature was maintained between −0.5° and +0.5° C. The mixture was then diluted with an equal volume of saturated sodium sulfate and extracted with ether. The ether extract was dried and the ether removed under reduced pressure.

The yield was 84% of the theoretical and had a purity of 83% based on active oxygen.

EXAMPLE II

Preparation of acetylenic diperesters (a) Preparation of 2,5-dimethyl-2,5-diper (2-ethyl hexanoate) hexyle-3.—257 grams of ice and 152.61 grams of 50% sodium hydroxide were mixed together and cooled to about 13° C. 52.38 grams of 2,5-dimethyl-2,5-dihydroperoxy hexyne-3 (95.2% purity) was added to the stirred mixture. Thereupon the temperature rose to about 20° C. 159.76 grams of 2-ethyl hexanoyl chloride (87.5% purity) was added very rapidly and the temperature maintained at 40° C. The mixture was rapidly stirred during this addition of the acid chloride and continued until the end of the reaction. The addition time of acid chloride was about 15 minutes. The reaction continued for another 15 minutes. The reaction mixture was then cooled to about 20° C. and sodium chloride and ether added to aid phase separation. The organic layer was washed twice with dilute potassium hydroxide (pH 11), thrice with water, once with dilute sulfuric acid (pH 1), and twice more with water. The resulting product was thereafter dried with sodium sulfate, filtered and concentrated under vacuum.

The product had a purity of 96.5% and was 78.8% of the theoretical yield.

(b) Preparation of 2,5-dimethyl-2,5-diperbenzoate hexyne-3.—In a process similar to Example II(a), 2,5-dimethyl-2,5-diperbenzoate hexyne-3 was prepared from benzoyl chloride in a yield of about 80% of the theoretical, with a purity of about 85%.

(c) Preparation of 2,5-dimethyl-2,5-diperdecanoate hexyne-3.—In a process similar to Example II(a), 2,5-dimethyl-2,5-diperdecanoate hexyne-3 was prepared from decanoyl chloride in a yield of about 75% of the theoretical, with a purity of about 80%.

(d) Preparation of 3,6-dimethyl-3,6-diperdeianoate octyne-4.—In a process similar to Example II(a), 3,6-dimethyl-3,6-diperdecanoate octyne-4 was prepared from decanoyl chloride and 3,6-dimethyl-3,6-dihydroperoxy-octyne-4 in a yield of about 75% of the theoreitcal, with a purity of about 80%.

(e) Preparation of 2,4,7,9-tetramethyl-4,7-diper-(2-methyl butanoate) decyne-5.—In a process similar to Example II(a), 2,4,7,9-tetramethyl-4,7-diper(2-methylbutanoate) decyne-5 was prepared from 2-methyl butanoyl chloride and 2,4,7,9-tetramethyl-4,7-dihydroperoxy decyne-5 in a yield of about 75% of the theoretical, with a purity of 85%.

(f) Preparation of 3,8-dimethyl-3,8-diper(2-ethyl hexanoate) decyne-4.—In a process similar to Example II(a), 3,8-dimethyl-3, 8-diper(2-ethyl hexanoate) decyne-4 was prepared from 2-ethyl hexanoyl chloride and 3,8-dimethyl-3,8-dihydroperoxy decyne-4 in a yield of about 75% of the theoretical, with a purity of about 80%.

(g) Preparation of 2,7-dimethyl-2,7-diperoctanoate octyne-4.—In a process similar to Example II(a), 2,7-dimethyl-2, 7-diperoctanoate octyne-4 was prepared from octanoyl chloride and 2,7-dimethyl-2,7-dihydroperoxy octype-4 in a yield of about 75 % of the theoretical, with a purity of about 70%.

.900 mole (146.3 grams) of octanoyl chloride is added with continued stirring and the temperature maintained at about 40° C. The addition of the acid chloride requires about 15 minutes. The reaction continues for about 10 additional minutes. Phase separation is then accomplished with sodium chloride and ether. The resulting organic layer is washed with dilute potassium hydroxide (pH 11), water, dilute sulfuric acid and again with water. The resulting product is dried with sodium sulfate, filtered and concentrated under vacuum.

(b) Preparation of 2,7-dimethyl-2,7-diper(2-ethyl hexanoate) octadi-3,5-yne.—In a process similar to Example III(a), the above-identified compound is prepared from 2,7-dimethyl-2,7-dihydroperoxy octadi-3,5-yne and 2-dihydroperoxy-octadi-3,5-yne and 2-ethyl hexanoyl chloride.

(c) Preparation of 3,8-dimethyl-3,8-diperbenzoate decadi-4,6-yne.—In a process similar to Example III(a), the above-identified compound is prepared from 3,8-dimethyl-3,8-dihydroperoxy decadi-4,6-yne and benzoyl chloride.

(d) Preparation of 2,8-dimethyl-2,8-diper(2-propyl pentanoate) nonadi-3,6-yne.—In a process similar to Example III(a), the above-identified compound is prepared from 2,8-dimethyl-2,8-dihydroperoxy nonadi-3,6-yne and 2-propyl pentanoyl chloride.

(e) Preparation of 3,10-dimethyl-3,10-diper(4-methyl benzoate) dodecadi-4,8-yne.—In a process similar to Example III(a), the above-identified compound is prepared from 3,10-dimethyl-3,10-dihydroperoxy dodecadi-4,8-yne and 4-methyl benzoyl chloride.

EXAMPLE IV

Polymerization initiation

As previously set forth, the compounds of the present invention are most useful in catalyzing reactions that are initiated by the presence of free radicals. The diperesters of alkyne diols, catalysts which form free radicals, initiate the polymerization of polyesters. These diperesters catalysts are employed in the same manner as other known peroxides.

The polymerized resins listed in Table II below were obtained in the following manner:

To 99.5 grams of the polymerizable polyester was added 0.5 gram of the diperester. Each of the mixtures was placed in contact with a mold and placed in an oven which had been preheated to the temperature indicated, and the mixture retained therein util cured.

TABLE II

| Catalyst | Plaskon P.E. 942 | | | Hetron 92 | | | Plaskon P.E. 461 | | |
|---|---|---|---|---|---|---|---|---|---|
| | Initial mold temp. (° F.) | Peak temp. (° F.) | Time to peak temp. (min.) | Initial mold temp. (° F.) | Peak temp. (° F.) | Time to peak temp. (min.) | Initial mold temp. (° F.) | Peak temp. (° F.) | Time to peak temp. (min.) |
| 2,5-dimethyl-2,5-diper (2-ethyl hexanoate) hexane | 180 / 212 / 250 | 412 / 394 / 442 | 32.5 / 15.5 / 11.2 | 250 | 410 | 10.0 | 250 | 430 | 8.5 |
| 2,5-dimethyl-2,5-diper (1-ethyl hexanoate) hexyne-3 | 180 / 212 / 250 | 419 / 403 / 428 | 29.5 / 16.0 / 9.5 | 250 | 406 | 9.0 | 250 | 424 | 9.4 |
| 2,5-dimethyl-2,5-diper-decanoate hexyne-3 | 180 / 212 | 340 / 372 | 66.5 / 35.5 | | | | | | |
| 2,5-dimethyl-2,5-diper-benzoate hexane | 212 | 383 | 46.0 | | | | | | |
| 2,5-dimethyl-2,5-diperbenzoate hexyne-3 | 212 | 372 | 39.5 | | | | | | |

EXAMPLE III

Preparation of diacetylenic diperesters (a) Preparation of 2,11-dimethyl-2, 11-diperoctanoate dodecadi-3,9-yne.—Two moles of 50% NaOH is diluted with sufficient ice to reduce the temperature of the mixture to about 10° C. To this mixture is added .300 mole (75.6 grams) of 2,11-dimethyl-2,11-dihydroperoxy dodecadi-3,9-yne, causing a slight temperature rise. Thereafter, Table II is a comparison of reaction results, i.e., the time to peak temperature and the peak temperature, produced with polyesters when subjected to variations in the initial oven, i.e., mold temperature. Visual observance revealed a substantially complete lack of distortion in the resin products wherein the curing process was catalyzed with the diperesters of alkyne diols. In contrast, the reaction products catalyzed with the diperesters of alkane diols were generally irregularly formed and distorted. In addition, the diperesters of both alkyne and alkane diols, having a branched alkyl grouping attached to the carbonyl radical, produced extremely "fast" reactions.

It will be appreciated by one of skill in this art that there is no peroxide catalyst which has totally superior properties when employed with all types of commercially available polyester resins under all conditions. However, it will be seen from the data in Table II that the diperesters of this invention, and especially the preferred diperesters containing a branched alkyl group, exhibited properties such as peak temperature and/or time to peak temperature, which were generally superior to those found for the corresponding diperester of an alkane diol.

Although the foregoing invention has been described in some detail by way of illustration and example for purposes of clarity of understanding, it is to be understood that certain changes and modifications may be practiced within the spirit of the invention.

What is claimed is:

1. A disperester of a dihydroperoxy alkyne of the formula:

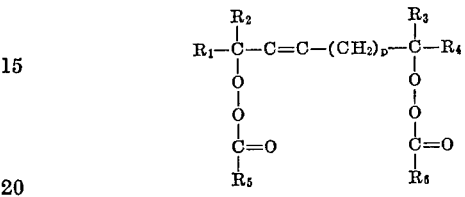

wherein $R_1$, $R_2$, $R_3$ and $R_4$ are lower alkyl groups of about one to five carbon atoms, $p$ is an integer of from 1 to 7, $m$ and $n$ are integers from 0 to 1 with the proviso that their sum be always at least 1, and $R_5$ and $R_6$ are alkyl groups of about 1 to 12 carbon atoms, with the further provisio that $R_5$ and $R_6$ are attached to the respective carbonyl carbon through a primary or secondary carbon atom.

2. A diperester in accordance with claim 1 of the formula:

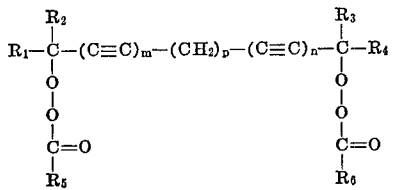

wherein $R_1$, $R_2$, $R_3$, $R_4$, $R_5$ and $R_6$ have the aformentioned definition and $p$ is an integer of from 1 to 7.

3. A diperester in accordance with claim 1 wherein $p$ is 1, $R_1$, $R_2$, $R_3$ and $R_4$ are methyl and $R_5$ and $R_6$ are 1-ethyl pentyl.

4. A diperester in accordance with claim 1 wherein $R_1$, $R_2$, $R_3$ and $R_4$ are methyl, and $R_5$ and $R_6$ are 1-propyl butyl.

5. A diperester in accordance with claim 1 wherein $p$ is 2.

6. A diperester in accordance with claim 1 wherein $p$ is 4.

7. A diperester in accordance with claim 1 of the formula:

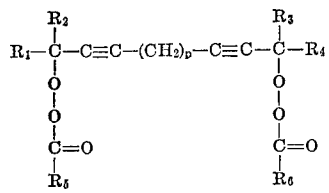

wherein $R_1$, $R_2$, $R_3$, $R_4$, $R_5$ and $R_6$ have the aforementioned definition and $p$ is an integer from 1 to 7.

8. A diperester in accordance with claim 7 wherein $p$ is 2.

9. A diperester in accordance with claim 8 wherein $R_1$ and $R_4$ are ethyl, $R_2$ and $R_3$ are methyl, $R_5$ and $R_6$ are 1-ethyl pentyl.

References Cited

UNITED STATES PATENTS

| | | | |
|---|---|---|---|
| 2,567,615 | 9/1951 | Milas | 260—453 |
| 3,444,230 | 5/1969 | Friedman et al. | 260—453 |
| 3,082,236 | 3/1963 | Mageli et al. | 260—453 |
| 3,214,422 | 10/1965 | Mageli et al. | 260—453UX |
| 3,236,872 | 2/1966 | Manly et al. | 260—453 |
| 3,264,274 | 8/1966 | Leveskis | 260—453UX |

OTHER REFERENCES

Industrial and Engineering Chemistry, volume 56, number 12, pp. 16 and 17 (1964).

Yurzhenko et al., Journal of Organic Chemistry of the U.S.S.R., volume 1, number 4, pp. 689–691 (1965).

Yurzhenko et al.: "Synthesis of Polymerization Peroxide Esters of Acrylic and Methacrylic Acids" (1965), CA 63, pp. 14692–93 (1965).

Milas et al.: "Organic Peroxides etc." (1959), CA 54, p. 1248 (1960).

LEWIS GOTTS, Primary Examiner

G. HOLLRAH, Assistant Examiner

U.S. Cl. X.R.

260—75